United States Patent
Sivasubramaniam et al.

(10) Patent No.: US 8,258,906 B2
(45) Date of Patent: Sep. 4, 2012

(54) SUPERCONDUCTING MAGNETIZER

(75) Inventors: Kiruba Sivasubramaniam, Niskayuna, NY (US); Patrick Lee Jansen, Schenectady, NY (US); Ernst Wolfgang Stautner, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 59 days.

(21) Appl. No.: 12/539,663

(22) Filed: Aug. 12, 2009

(65) Prior Publication Data
US 2011/0037545 A1 Feb. 17, 2011

(51) Int. Cl.
*H02K 55/00* (2006.01)
*H01F 6/06* (2006.01)
*H01F 13/00* (2006.01)

(52) U.S. Cl. ........ 335/284; 335/216; 310/156.01; 505/876; 505/879

(58) Field of Classification Search .......... 335/216, 335/301, 284; 310/52–54, 156.01; 505/876–879
See application file for complete search history.

(56) References Cited

U.S. PATENT DOCUMENTS

| | | | |
|---|---|---|---|
| 3,678,436 A | 7/1972 | Herdrich et al. | |
| 4,748,535 A | 5/1988 | Arawaka et al. | |
| 5,517,168 A * | 5/1996 | Dorri et al. | 335/301 |
| 5,565,831 A * | 10/1996 | Dorri et al. | 335/216 |
| 6,084,496 A | 7/2000 | Asane et al. | |
| 6,380,654 B1 | 4/2002 | Dokonal et al. | |
| 6,441,521 B1 | 8/2002 | Dombrovski et al. | |
| 6,674,205 B2 | 1/2004 | Biais et al. | |
| 6,684,483 B2 | 2/2004 | Rahman et al. | |
| 6,703,746 B2 | 3/2004 | Biais et al. | |
| 8,022,797 B2 * | 9/2011 | Takeda et al. | 335/216 |
| 2004/0070361 A1 | 4/2004 | Carrier et al. | |

FOREIGN PATENT DOCUMENTS

| | | |
|---|---|---|
| DE | 1037010 A | 8/1958 |
| DE | 3138052 A1 | 9/1981 |
| GB | 2359417 A | 8/2001 |
| WO | WO 2007148722 A1 * | 12/2007 |

* cited by examiner

*Primary Examiner* — Ramon Barrera
(74) *Attorney, Agent, or Firm* — Jason K. Klindtworth

(57) ABSTRACT

A magnetizer for magnetizing permanent magnets positioned in-situ a mechanical member is disclosed. The magnetizer comprises at least one primary superconducting coil configured to project a magnetic field flux configuration of a first type to at least a portion of a distal volume of a first type, and at least two auxiliary coils symmetrically disposed about the at least one primary superconducting coil and configured to project magnetic field flux configurations of a second type to at least a portion of a distal volume of a second type. A method of magnetizing a permanent magnet in-situ within a mechanical member is also disclosed.

30 Claims, 6 Drawing Sheets

SUPERCONDUCTING MAGNETIZER

BACKGROUND

The invention relates generally to the area of magnetizers. More specifically, the invention relates to the area of magnetizers for magnets that are disposed in-situ within a mechanical member, such as a rotor of an interior permanent magnet machine.

The rotors of many electric machines include permanent magnets that produce magnetic field flux, which magnetic field flux interacts electromagnetically with a stator. The electromagnetic interaction results in a conversion of electromagnetic energy to mechanical energy within the electric machine.

Interior permanent magnet electric machines constitute a class of electric machines in which the permanent magnets are buried within the bulk of the rotor. In an as-formed state, the permanent magnets do not have any net magnetic moment. However, design principles of the electric machines require that the permanent magnets disposed within the bulk of the rotor be in a magnetized state before the electric machine can be put in operation.

Two approaches to the processes of magnetization and assembly of permanent magnet electric machines are known within the art. In the first approach, the permanent magnets are magnetized before they are disposed within the bulk of the rotor. This approach presents several drawbacks from the point of view of an industrial assembly process for electric machines. For instance, it will be appreciated that fully magnetized permanent magnet pieces would be subject to electromagnetic interaction with all surrounding objects, which in turn adds to the complexity of their handling procedures. In the second approach, the as-formed permanent magnets are disposed within a rotor and a magnetizer is used to magnetize the permanent magnets.

The second approach also presents several drawbacks from the point of view of an industrial assembly process for electric machines. For instance, the energy and fabrication costs for magnetizers capable of generating, at the location of the permanent magnets, a magnetic field flux sufficient to magnetize the permanent magnets, are prohibitive. Typical prior art in-situ magnetizers are able to economically magnetize permanent magnets made of materials or grades, such as alnico and ferrite, that have low intrinsic coercivity. Such prior art in-situ magnetizers also find limited use for magnetizing surface mounted permanent magnets. Many emerging applications for permanent magnet electric machines, such as wind turbine applications, or traction applications, would benefit from the use of high-coercivity rare-earth permanent magnet materials. In-situ magnetization of such high-coercivity rare-earth permanent magnets is not economically feasible via prior art in-situ magnetizers.

A magnetizer that is capable of economically providing user definable magnetic flux field configurations at the locations where the permanent magnets for example, high-coercivity rare-earth permanent magnets, are disposed within a mechanical member, for example a rotor, and having a design that is readily adaptable for electric machines of different sizes and configurations, would therefore be highly desirable.

BRIEF DESCRIPTION

Embodiments of the invention are directed to a magnetizer capable of magnetizing permanent magnets disposed in-situ within a mechanical member such a rotor.

A magnetizer for magnetizing permanent magnets positioned in-situ a mechanical member, comprising at least one primary superconducting coil configured to project a magnetic field flux configuration of a first type to at least a portion of a distal volume of a first type, and at least two auxiliary coils symmetrically disposed about the at least one primary superconducting coil and configured to project magnetic field flux configurations of a second type to at least a portion of a distal volume of a second type.

A method of magnetizing a permanent magnet in-situ a mechanical member, said method comprising the steps of, (a) disposing at least one primary superconducting coil adjacent the mechanical member, (b) disposing at least two auxiliary coils symmetrically about the at least one primary superconducting coil, and (c) energizing the at least one primary superconducting coil and the at least two auxiliary coils.

A magnetizer, comprising at least one primary superconducting coil configured to project a magnetic field flux configuration of a first type to a distal volume, at least two auxiliary superconducting coils symmetrically disposed about the at least one primary superconducting coil and configured to independently project magnetic field flux configurations of a second type to at least a portion of the distal volume, and a ferromagnetic member configured to support at least a portion of the magnetic field flux.

These and other advantages and features will be more readily understood from the following detailed description of preferred embodiments of the invention that is provided in connection with the accompanying drawings.

DRAWINGS

DETAILED DESCRIPTION

Figure 1:
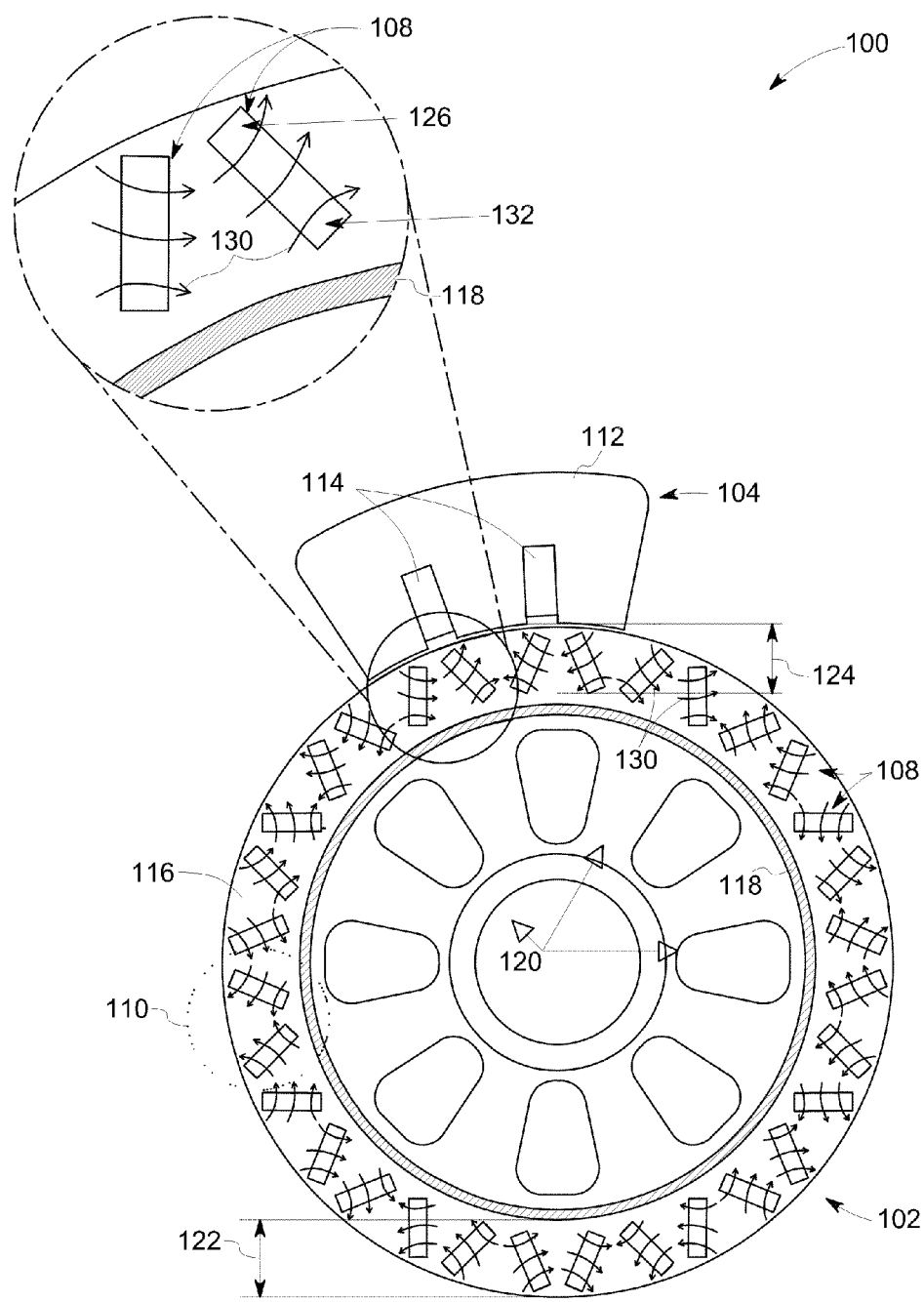
FIG. 1 is a diagrammatic illustration of a prior art arrangement for magnetizing a rotor using a prior art magnetizer.

In the following description, whenever a particular aspect or feature of an embodiment of the invention is said to comprise or consist of at least one element of a group and combinations thereof, it is understood that the aspect or feature may comprise or consist of any of the elements of the group, either individually or in combination with any of the other elements of that group.

Permanent magnet electric machines such as generators with rare earth permanent magnets are typically assembled by magnetizing permanent magnets disposed therein first, and then positioning or assembling them into the interior "bulk" of the electric machine. Assembly procedures of this type, wherein pre-magnetized permanent magnets are assembled into the bulk of an electric machine, usually are feasible only for relatively small electric machines that only require permanent magnets that are sufficiently small in size whereby they can be conveniently handled in a magnetized state. On the other hand, for relatively larger electric machines, elaborate fixtures and procedures are required to reliably handle magnetized permanent magnets and position them properly in the bulk of the electric machine. It will be appreciated that such elaborate fixtures and procedures increase the cost, and the time required for assembly of such large electric machines. It may therefore be beneficial to magnetize the permanent magnets post-assembly into the electric machine, that is, to magnetize the permanent magnets in-situ within the electric machine after they have been positioned within the bulk of the electric machine. The feasibility of such an approach depends on the availability of external magnetizers capable to reliably magnetizing the permanent magnets in-situ within the electric machine. Such external magnetizers, if they are developed, are likely to favorably affect the material and engineering cost, and assembly time, aspects of the electric machine manufacturing process.

Conventional prior art magnetizers are designed with resistive electromagnetic coils, and require large power supplies in order to generate magnetic fields for magnetizing permanent magnetic materials. The resistive nature of the electromagnetic coils results in substantial Joule dissipation within them, and necessitates elaborate, and therefore costly, thermal management systems. A current approach to mitigate thermal management issues involves operating the power supplies at high duty cycles. Attendant to this approach is a requirement whereby conventional magnetizers are designed so that they may be energized and de-energized rapidly. For instance, typical conventional magnetizers need to be energized and de-energized at the ramp rates of ~1 Tesla per second, which ramp rates can only be achieved with large power supplies. Such high duty cycle operation will likely result in a reduction in energy consumption as compared to the case where the magnetizers are operated continuously. Evidently therefore, high duty cycle operation of the magnetizer would also result in a reduction in the thermal management challenge. High duty cycle operation of such magnetizers, however, is limited by the inductance and resistance of the electromagnetic coils from which is composed the magnetizer, which in turn places an increased energy demand on the power supply.

Furthermore, resistive electromagnetic coils are limited in their ability to project a magnetic field to locations at meaningful distances away from the themselves. For instance, for a typical large (about 1 to about 5 Mega Watt) electrical machine with interior permanent magnets, the permanent magnets may be positioned within a rotor backiron at distances ranging from about 3 to about 100 millimeters (mm) from the outermost periphery of the rotor backiron. Evidently, the magnetizer necessarily has to be located beyond the periphery, and so the magnetizer must be capable of performing its magnetizing action over such distance scales. Such considerations are now discussed in relation to FIG. 1.

FIG. 1 is a diagrammatic illustration 100 of a prior art arrangement for magnetizing a rotor 102 using a prior art magnetizer 104. The rotor, for instance, is part of a permanent magnet electric machine 106 (not depicted). The magnetizer 104 is disposed to magnetize one or more of a plurality of permanent magnets 108 disposed within the rotor 102. Various configurations for the disposition of the plurality of permanent magnets 108 within the rotor 104 are known in the art. For instance, in the embodiment 102 shown in FIG. 1, the plurality of permanent magnets are disposed in a "V" shaped configuration 110. The magnetizer 104 includes a magnetizer head 112, and coils 114 that form the electromagnetic poles of the magnetizer 104. The coils 114 are energized to perform the magnetizing action of the magnetizer 104 whereby a magnetic field flux 130 is produced at least partially within the volumes occupied by the permanent magnets. The rotor 102 includes a backiron 116 usually constructed from laminated sheet metal. In the embodiment shown in FIG. 1, the plurality of permanent magnets 108 are positioned within the bulk of the backiron 116. The rotor 102 further includes a rotor tube 118 that is a magnetically inactive carrying structure. The rotor 102 also includes further structures 120 the purpose and operation of which would be known to one of skill in the art.

Electromechanical considerations, among other factors, dictate the thickness 122 of the rotor backiron 116. The considerations are related to, for instance, the amount of permanent magnetic material that is required to be contained within the backiron 116, the arrangement of the permanent magnetic material required for a particular operational rating, and the intended application of the permanent magnet electric machine 106. Such considerations are known to one of skill in the art. Such considerations therefore, dictate the minimum thickness 122 of the backiron 116, which in turn fixes the minimum possible distance scale 124 between magnetizer 104 and the permanent magnets. The magnetizing action of the permanent magnets must be reliably performed over this distance scale 124. Reliable in-situ magnetizing of portions 132 of the permanent magnets that are disposed distally with respect to the magnetizer 104 (as opposed to portions 126 of the permanent magnets that relatively are disposed closer to the magnetizer 104) remains a challenge within the art.

For instance, it is known in the art that, to substantially completely magnetize permanent magnets belonging, for instance, to the neodymium-iron-boron (Nd—Fe—B) class, a magnetizing field value of at least about 1600 kilo Ampere per meter (kA/m) is required (see for instance, International Electrotechnical Commission, Technical Committee 68: Magnetic Alloys and Steels). It is known in the art that conventional prior art magnetizers incorporating resistive electromagnetic coils cannot reliably project magnetic fields of such values over backiron geometry constraints, or backiron distance scales that are typically encountered in rotors, for instance, for large (typically greater than about 1 Mega Watt) wind generator applications.

Figure 2:
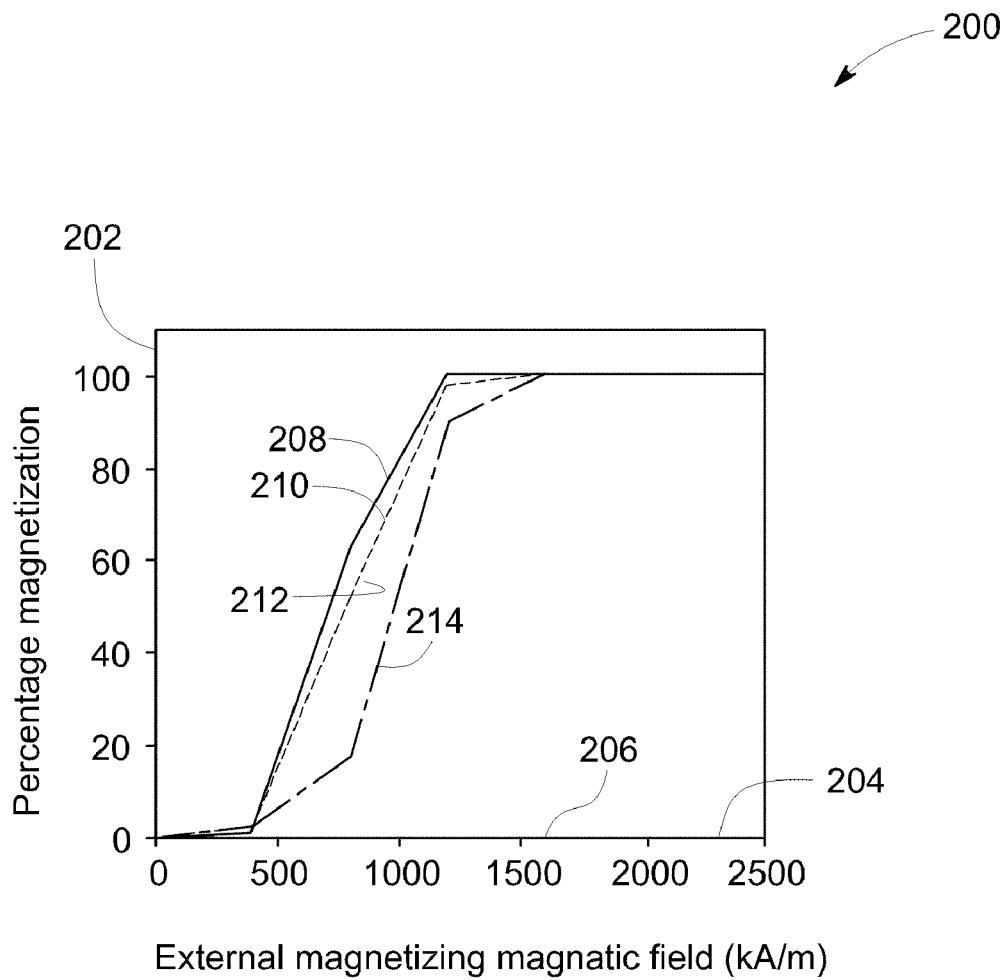
FIG. 2 is a graph that depicts prior-art data of the variation of percentage magnetization as a function of applied magnetizing magnetic field for different non-limiting permanent magnetic materials.

In addition to the electromechanical considerations discussed above, the magnetic properties of the permanent magnetic materials used also need to be accounted for, before any scheme for magnetizing permanent magnets in-situ within a rotor can be developed. FIG. 2 therefore, is a graph 200 that depicts prior-art data of the variation of percentage magnetization, plotted along the ordinate 202, as a function of applied magnetizing magnetic field, plotted along the abscissa 204, for different non-limiting permanent magnetic materials. For instance, data sets 208, 210, 212, and 214 represents variation of percentage magnetization as a function of applied magnetizing magnetic field four representative types of sintered Neodymium-Dysporium-Iron-Boron (Nd—Dy—Fe—B) permanent magnetic materials having the magnetic properties as listed in Table 1.

TABLE 1

| Reference Numeral of Data Set shown in FIG. 2 | Remanent Flux Density "$B_r$" (Tesla) | Intrinsic Coercivity "$H_{cJ}$" (kiloAmpere/meter) |
|---|---|---|
| 208 | 1.40 | 1180 |
| 210 | 1.35 | 1500 |
| 212 | 1.27 | 1790 |
| 214 | 1.21 | 2440 |

It may be evident to one of skill in the art from the intrinsic coercivity "$H_{cJ}$" values listed above, and from the data sets 208, 210, 212, and 214, shown in FIG. 2, that for substantially completely magnetizing typical conventional Nd—Dy—Fe—B permanent magnetic materials, a magnetizing magnetic field value of about 1.6 MegaAmpere per meter (MA/m) is required. In other words, the magnetizing magnetic field 206 refers to a saturation magnetizing magnetic field "$H_{Sat}$." In light of the above discussions, it may be evident that there is a need within the art for magnetizers that are capable of projecting a magnetizing magnetic field of at least about 1600 MA/m over distance scales of at least about 100 mm.

As discussed in detail below, embodiments of the invention are directed to superconducting magnetizers for permanent magnets in-situ within a mechanical member such as a rotor. As used herein, the word "in-situ" refers to the fact that the magnet is positioned within the bulk of the rotor, for instance, within the backiron of the rotor. The rotor, for instance, may be a part of an electric machine. Quite generally, such machines in which the permanent magnets are positioned within the rotor will be referred to as interior permanent magnet machines. Embodiments of the system and method disclosed herein reliably enable magnetization of substantially the complete magnet in-situ within a mechanical member. Even those portions of the permanent magnets, for instance, portions that constitute the bulk of the permanent magnet, and which are disposed at a distance where previously it has not been possible to make create a magnetizing magnetic field of sufficient magnitude and configuration, can be reliably magnetized via embodiments of the present invention.

According to one aspect of the invention therefore, a superconducting magnetizer is disclosed. The magnetizer is capable at least of mitigating the shortcomings of conventional resistive magnetizers as discussed above. Non-limiting examples of systems or subsystems thereof, which may be magnetized by such magnetizers include interior permanent magnet electric machine rotors for geared and gearless wind turbine generators, traction motors for electric vehicles and locomotives, and industrial applications such as compressor motors for the oil and gas industry. The insight resulting substantially in the present invention is that superconductors are capable of carrying enhanced current densities (as compared to resistive conductors) without displaying a voltage drop. In other words, a magnetizer incorporating superconducting coils would display thermal dissipation levels that are reduced as compared to a magnetizer incorporating conventional resistive coils. Furthermore, superconducting coils are capable of supporting enhanced electric current densities as compared to conventional resistive coils. These features of superconducting coils result in a substantial mitigation of the need to pulse the magnetic field in order to reduce thermal dissipation levels. For instance, magnetizers incorporating superconducting coils need to be energized and de-energized at the ramp rates of ~1 Tesla per minute (as compared to conventional magnetizers incorporating conventional resistive coils, which need to need to be energized and de-energized at the ramp rates of ~1 Tesla per second), which ramp rates can be achieved with power supplies much smaller than those required for conventional magnetizers (discussed above). Magnetizers incorporating superconducting coils have an attendant desirable feature that the requirements of power supply design, in terms of energy requirements, as well as in terms of the inductive and resistive load handling requirements, are simplified, which in turn leads to a reduction of the cost of developing and maintaining such a power supplies.

Figure 3:
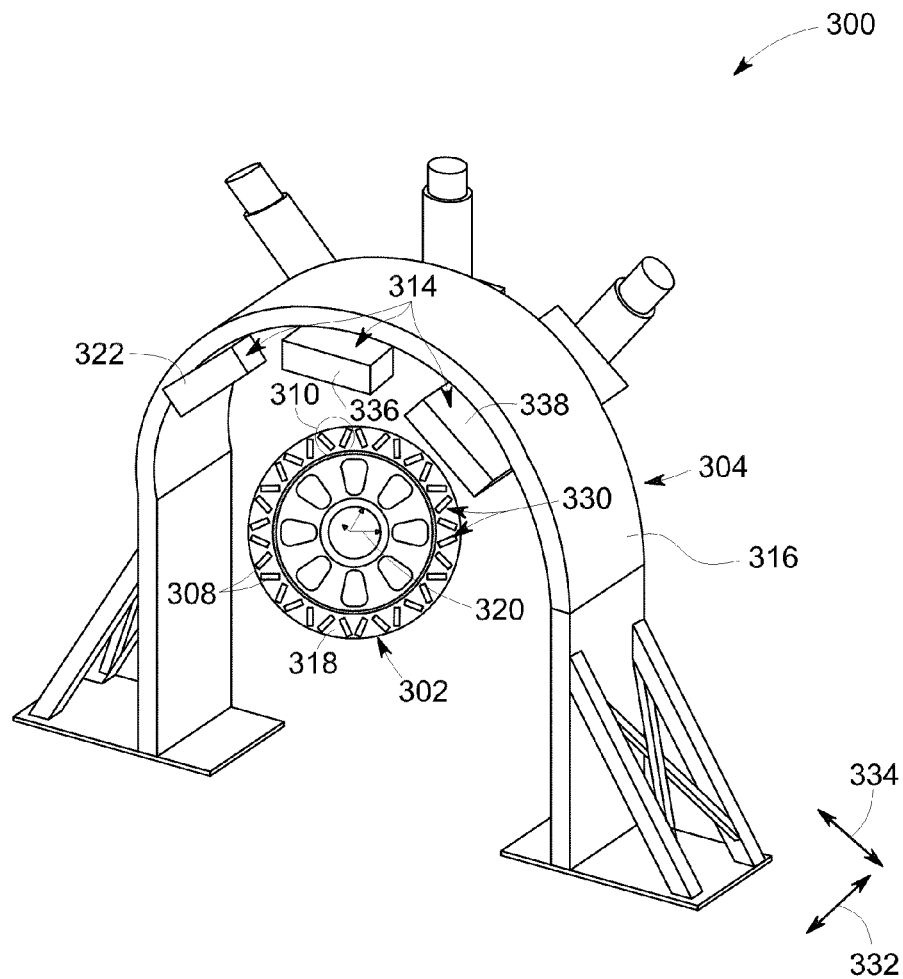
FIG. 3 is a diagrammatic illustration 300 of a magnetizer arrangement for magnetizing a rotor using a magnetizer, in accordance with one embodiment of the invention.

Embodiments of the invention disclosed herein improve at least over the above-mentioned inadequacies of prior art magnetizer arrangements as were discussed in reference to FIG. 1. In one embodiment of the invention, magnetizers capable of independently magnetizing at least one of a plurality of permanent magnets positioned or buried within, that is, in-situ, a mechanical member such as a rotor, are disclosed. FIG. 3 is a diagrammatic illustration 300 of a magnetizer arrangement for magnetizing a rotor 302 using a magnetizer 304, in accordance with one embodiment of the invention. The rotor 302 is part of a permanent magnet electric machine 306 (not depicted). Quite generally, the rotor 302 includes a plurality of laminations (not depicted) stacked so as to be oriented along an axial direction 332 of the rotor 302. The magnetizer is positioned to magnetize at least one of the plurality of permanent magnets 308 disposed within the rotor 302. In the rotor embodiment 302 shown in FIG. 3, the plurality of permanent magnets are disposed in a "V" shaped configuration 310. The magnetizer 304 includes a plurality of magnetizer coils 312 (not depicted for sake of clarity; see FIG. 4) housed individually within a plurality of chambers 314, which plurality of chambers 314 may be cryogenic chambers. The magnetizer 304 further includes a support member 316 configured at least to provide mechanical support to support the plurality of chambers 314. In alternate embodiments of the invention, the support member 316 is further configured to support at least a portion of the magnetic field flux (see, for instance, FIG. 5) while simultaneously providing mechanical support for the magnetizer 304. In such alternate embodiments of the magnetizer where the support member 316 is configured to support a magnetic field flux, the support member 316 may be composed of a ferromagnetic material.

The rotor 302 includes a backiron 318 usually constructed from laminated sheet metal. In the embodiment shown in FIG. 3, the plurality of permanent magnets 308 are positioned within the bulk of the backiron 318. Quite generally, the rotor backiron 318 includes a plurality of poles 330 which house the plurality of permanent magnets 308. In one embodiment of the invention, the plurality of permanent magnets 308 are oriented along a substantially radial direction 334 of rotor 302. The rotor 302 further includes other structures 320, the purpose and operation of which would be known to one of skill in the art. Furthermore, the embodiment shown in FIG. 3 includes three chambers, 322, 336, and 338, housing one coil (see FIG. 4) each. However, magnetizers of type 304 designed with other numbers of chambers, each of which may contain multiple coils, fall within the scope of the present invention.

Figure 4:
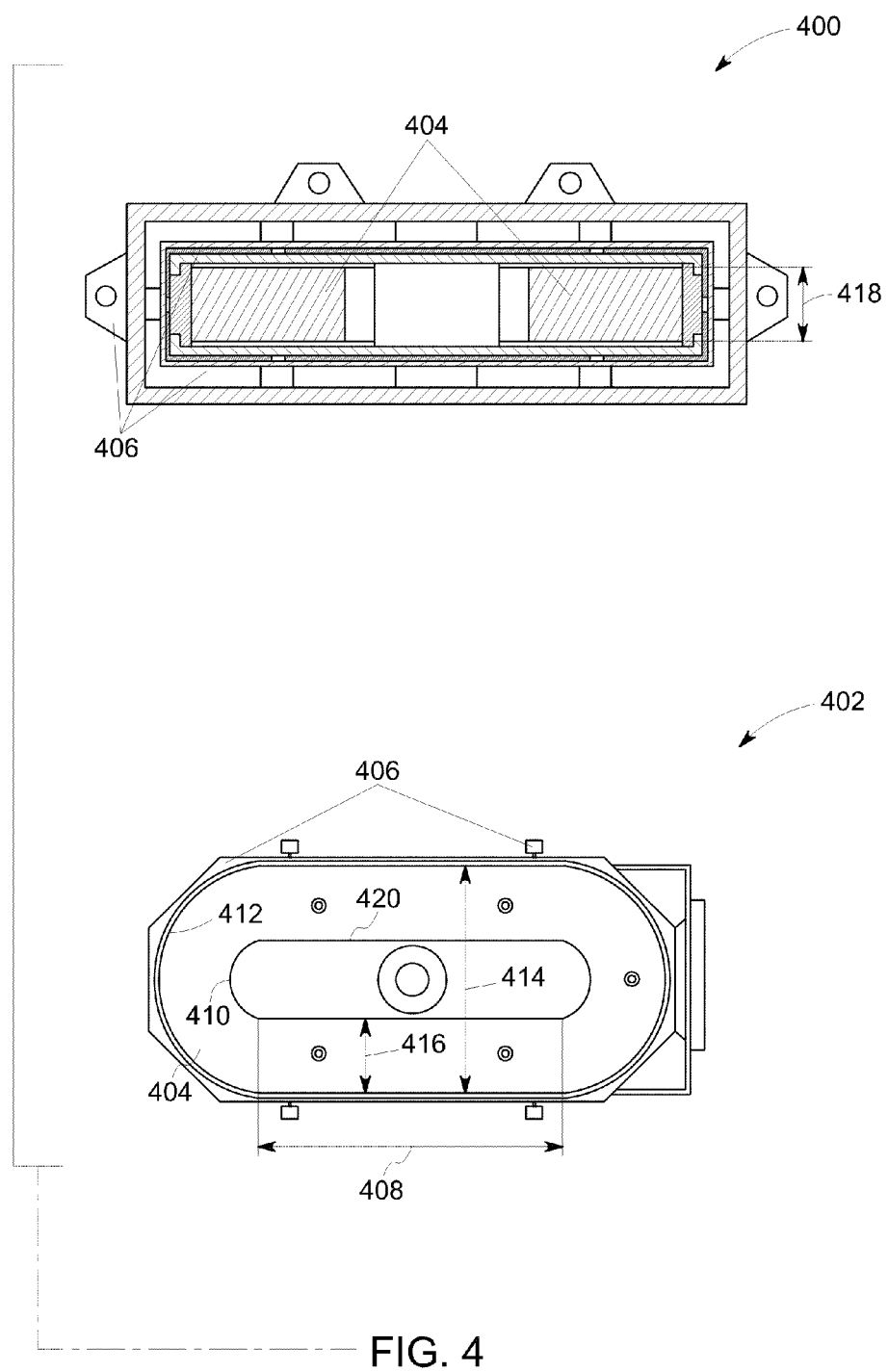
FIG. 4 illustrates, in side cross section cut-out view, and in top cross section cut-out view, one chamber, which chamber has been designed as a cryogenic chamber.

FIG. 4 illustrates, in side cross section cut-out view 400, and in top cross section cut-out view 402, one of the chambers, say chamber 336, which chamber 336 has been designed as a cryogenic chamber. The cross section cut-out view 400 also shows a cross section view of a superconducting coil 404 housed inside the depicted "cryogenic" embodiment of chamber 336. Other electromechanical structures 406 that would be known to one of skill in the art are also depicted. In one embodiment, the superconducting coil 404 is designed to have a peak magnetic field production capability to generate a magnetic field (which is available at substantially the center of the superconducting coil 404) of about 10 Tesla at a peak electric current of about 879 Amperes. In one such embodiment, the superconducting coil has a total of 65 layers of 21 turns each. The structural dimensions of one embodiment of the superconducting coil 404 are also illustrated in the FIG. 4. As may be evident, in the illustrated embodiment, the coil is designed in a "racetrack" geometry whereby a length 408 of a straight edge 420 of the superconducting coil is about 372 millimeters (mm), a radius of curvature of a first curved portion 410 is about 56 mm, a radius of curvature of a second curved portion 412 is about 151 mm. The outer dimension 414 (in the plane of the superconducting coil 404 and substantially transverse to the straight edge 420 of the superconducting coil 404) is about 302 mm, while the inner dimension 416 (in the plane of the superconducting coil 404 and substantially transverse to the straight edge 420) is about 95 mm. Furthermore, the superconducting coil 404 has an axial (substantially perpendicular to the plane of the superconducting coil 404) thickness 418 of about 45 mm.

Finite element modeling studies were performed to ascertain the electromagnetic features of the magnetizer 304. The magnetizing magnetic field strength produced within the volume occupied by the permanent magnets was calculated, and the results are discussed in relation to FIGS. 5 and 6. For the purposes of the finite element modeling studies, a superconducting coil with 1.2 Mega Ampere-turns was used, which coil generates a minimum internal magnetic field having a value substantially of about 1.6 MA/m.

Figure 5:
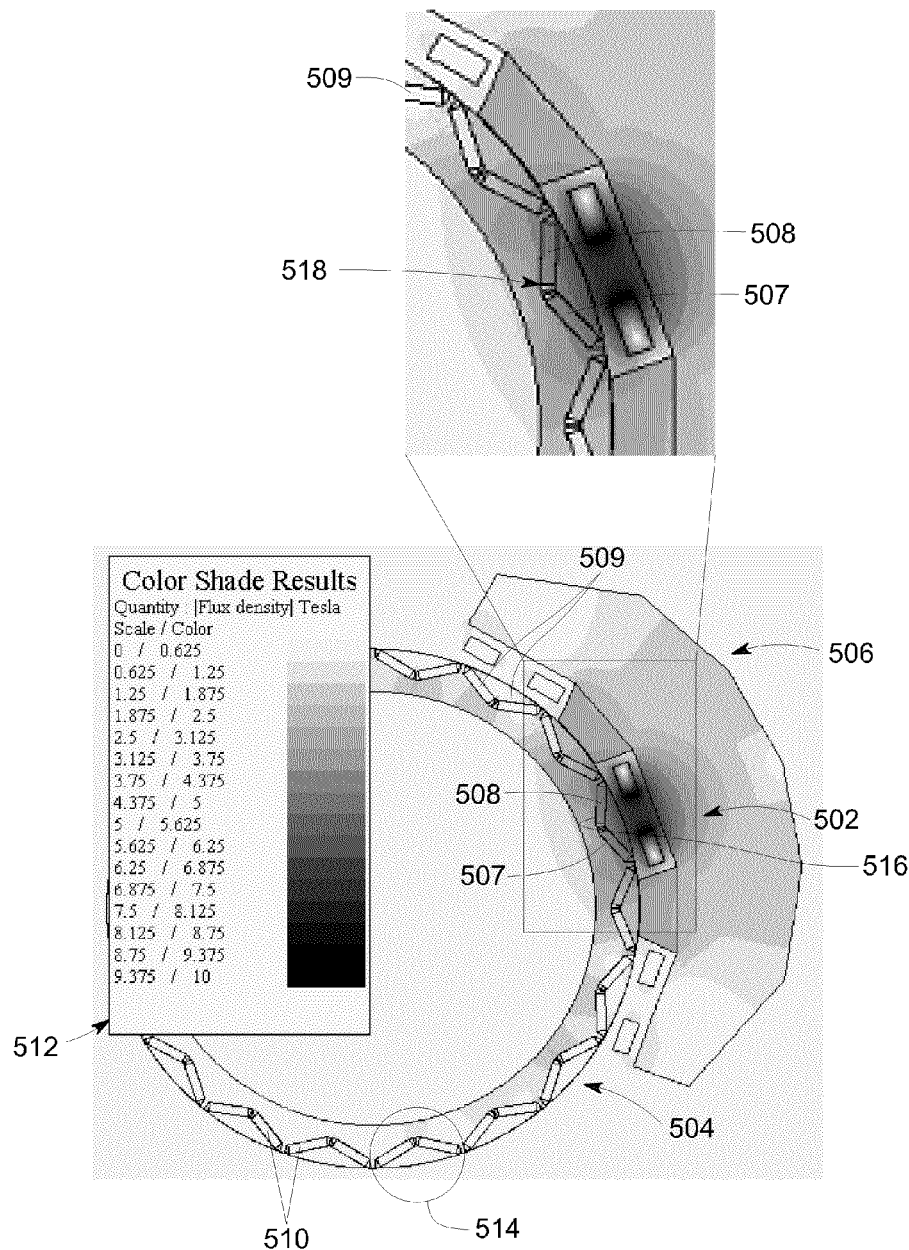
FIG. 5 is a magnetizing magnetic field flux density distribution plot of a simulated magnetizing field produced via a magnetizer, in accordance with one embodiment of the invention.

Embodiments of the invention disclosed via FIGS. 3 and 4 are capable of reliably magnetizing permanent magnets disposed in-situ within a mechanical member such as a rotor. For instance, FIG. 5 is a magnetizing magnetic field flux density distribution plot of a simulated magnetizing field produced via a magnetizer of type 304 (FIG. 3). The magnetic field flux density distribution plot 502 is shown superimposed onto the schematic depiction of rotor 504. The magnetizer 506 that created the magnetic field according to magnetic field flux density distribution plot 502 is disposed with respect to the rotor 504 similarly to as shown in FIG. 3, that is, externally to the rotor 504, and so that it (that is, the magnetizer 506) is placed substantially symmetrically disposed with respect to the permanent magnets 507 and 508, of the plurality of permanent magnets 510. The strength of a magnetizing field produced at any spatial location is indicated via chart 512. In the rotor embodiment 504, the plurality of permanent magnets 510 are disposed in a "V" shaped configuration 514. In the following discussions, considerations related to the use of the magnetizer to magnetize a single pole of permanent magnets, say, permanent magnets 507 and 508, will be discussed. However, magnetizers of type 304, designed to simultaneously magnetize any number of permanent magnets fall within the scope of the present invention.

The magnetizer embodiment 304 consists of a primary superconducting coil 324 (not depicted for clarity) that is disposed within "cryogenic" chamber 336 and two symmetrically disposed auxiliary coils 326 (not depicted for clarity) and 328 (not depicted for clarity) disposed respectively within chambers 322 and 338. However, a non-limiting embodiment of the superconducting coil 324 is depicted in FIG. 4, while design considerations of coils of type 326, or 328 are well known in the art. The auxiliary coils 326 and 328 serve a function of providing a "correction" magnetic field over the volume occupied by permanent magnets such as over the permanent magnets 509 that are disposed "one pole over" permanent magnets 507 and 508. The corrective action of the auxiliary coils is required because, it has been ascertained that while the magnetic field produced by the primary superconducting coil 324 has a magnetizing action on the permanent magnets 507 and 508, the same magnetic field has a pre-magnetizing in an undesired direction or a demagnetizing action on the one pole over (with respect to permanent magnets 507 and 508) permanent magnets 509. Therefore, in the presently shown embodiment, two auxiliary coils 326 and 328 are provided to provide correction magnetic fields over the volume occupied by the permanent magnets 509 and other magnets symmetrically disposed about the pole being magnetized. The required correction magnetic field is typically a fraction of the magnetic field produced by the primary superconducting coil, and therefore, the auxiliary coils 326 and 328 may be constructed with normal conductors, for instance copper, or with low critical current density ("low temperature") superconductors, for instance niobium titanium.

Therefore, in one embodiment, the auxiliary coils 326 and 328 are designed to operate with about 10% of the excitation of the primary superconducting coil 324, which is sufficient to produce the required magnitude of correction magnetic field via coils 326 and 328. The auxiliary coils have reduced ampere-turn requirements as compared to the primary coil, but otherwise can be similar in construction and assembly to the primary coil. In the presently shown embodiment, the presence of the auxiliary coils substantially ensures that the magnetic field in the permanent magnets, such as, permanent magnet 509 is limited to below 500 A/m in a direction "reverse" to the direction of the magnetic field present over permanent magnet 508. Furthermore, as discussed in relation to FIG. 6, it was ascertained that a minimum of the magnetizing magnetic field strength over the volume occupied by permanent magnet 508, occurs on the short extremities or edges of the permanent magnets.

Non-limiting examples of materials from which the primary superconducting coil may be composed include β-tungsten type superconductors, high temperature superconductors, and combinations thereof. Non-limiting examples β-tungsten type superconductors from which the primary superconducting coil may be composed include $Nb_3Al$, $Nb_3Ga$, $Nb_3Sn$, $V_3Al$, $V_3Ga$, and combinations thereof. Non-limiting examples high temperature superconductors from which the primary superconducting coil may be composed include yttrium barium copper oxide (YBCO), bismuth copper strontium oxide (BSCCO), and combinations thereof. In one embodiment of the invention, the at least primary superconducting coil is composed from a material having a critical temperature between about 5 Kelvin to about 23 Kelvin. Non-limiting examples of materials from which the auxiliary coils may be composed include normal conductor materials, low temperature superconductor materials such as niobium-titanium, medium temperature superconductors such as magnesium diboride ($MgB_2$), and high temperature superconductor materials such as YBCO, BSCCO.

Quite generally, a means to independently maintain the at least one primary superconducting coil in a superconductive state are included within the scope of the present invention. In one embodiment of the invention, the primary superconducting coil 324 is capable of producing a magnetic field of up to 10 Tesla for an engineering current density of about 225 Amperes per square millimeter. In alternate embodiments of the invention, the at least one primary superconducting coil 324 is capable of supporting current densities of up to about 25 Amperes per square centimeter ($A/cm^2$). Quite generally therefore, a means to drive electric current through, that is, energize, the at least one primary superconducting coil 324 when it is in a superconductive state, are included within the scope of this invention. Such embodiments of the invention wherein the at least auxiliary coils 326 and 328 are composed of superconducting material, may further include a means to drive electric current through, that is, energize, the at least two auxiliary coils 326 and 328 when they are in a superconductive state. In one embodiment of the invention, the superconducting coils are composed of a niobium tin compound such as $Nb_3Sn$. Conceivably, heavy saturation of the permanent magnets will result in a mitigation of the peak magnetic field $H_{Sat}$ requirements and the ampere-turn requirements of the superconducting coils.

As discussed, magnetizers wherein the at least one primary superconducting coil and the at least two auxiliary superconducting coils are composed respectively of superconducting conductors and normal conductors fall within the purview of the present invention. In such embodiments, energization of the at least one primary superconducting coil, and of the at least two auxiliary coils, must be performed so that AC losses within the superconducting coil, as well as Joule dissipation losses within the at least two auxiliary coils, do not exceed operational safety limits. For instance, control of ramp rate of energization of the at least one primary superconducting coil and the at least two auxiliary coils may be controlled to ensure operation of the magnetizer within the operational safety limits. In this context, the at least one primary superconducting coil, and the at least two auxiliary coils may be energized simultaneously, or independently of each other. The design considerations of the means, for instance, the power supply, if it is required to energize the at least one primary superconducting coil and the at least two auxiliary coils simultaneously, are likely simpler than the design considerations of the means if it is required to energize the at least one primary superconducting coil and the at least two auxiliary coils independently of each other.

Quite generally therefore, embodiments of the invention disclosed herein include a magnetizer (for instance of type 304) for magnetizing permanent magnets (for instance, of type 508) positioned in-situ a mechanical member (for instance, a rotor of type 302), comprising, at least one primary superconducting coil (for instance, of type 404) configured to project a magnetic field flux configuration of a first type to at least a portion of a distal volume of a first type (for instance, over the volume occupied by the permanent magnets 508), and at least two auxiliary coils (for instance, of type 326, or 328) symmetrically disposed about the at least one primary superconducting coil (for instance, as depicted in FIG. 3) and configured to project magnetic field flux configurations of a second type (for instance, the "correction" magnetic field discussed above) to at least a portion of the distal volume of a second type (for instance, over the volume occupied by the permanent magnets 509).

Figure 6:
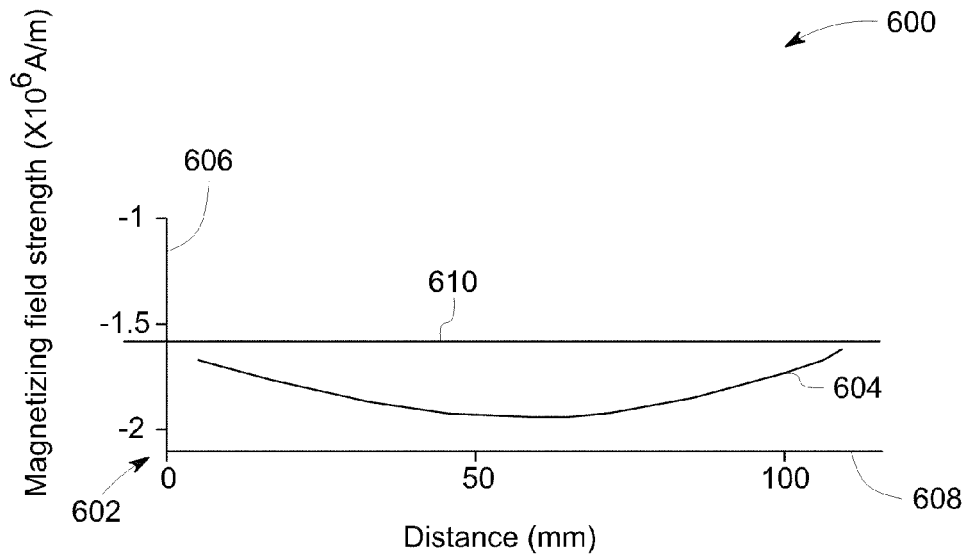
FIG. 6 is a graph showing the magnetizing field strength corresponding to the magnetic field flux density distribution plot shown in FIG. 5, available along a long edge of a permanent magnet, in accordance with one embodiment of the invention.

As per the earlier discussions in relation to FIGS. 2 and 5, the discussions in relation to FIG. 6 will be with respect to a representative value of $H_{sat}$ of about 1.6 MA/m. The magnetizing field configuration produced by the magnetizer 504 is now discussed in relation to permanent magnets 508.

FIG. 6 is a graph 600 showing the magnetizing field strength corresponding to the magnetic field flux density distribution plot 502, available along a long edge, for instance, of type 516, of the permanent magnet 508. The origin 602 of graph 600 corresponds to vertex 518 of the permanent magnet 508. The graph 600 then plots the simulated value of magnetizing field strength 604 along the ordinate 606 as a function of the distance from origin along the long edge, plotted along the abscissa 608. The assumed saturation magnetizing magnetic field $H_{Sat}$ value 610 is also shown. It may be evident that the magnetizing field strength 604 exceeds $H_{sat}$ for the entire length of the long edge of about 110 mm. Evidently therefore, the magnetizer arrangement will prove to be adequate to reliably magnetize the permanent magnet 508 in its entirety.

Figure 7:
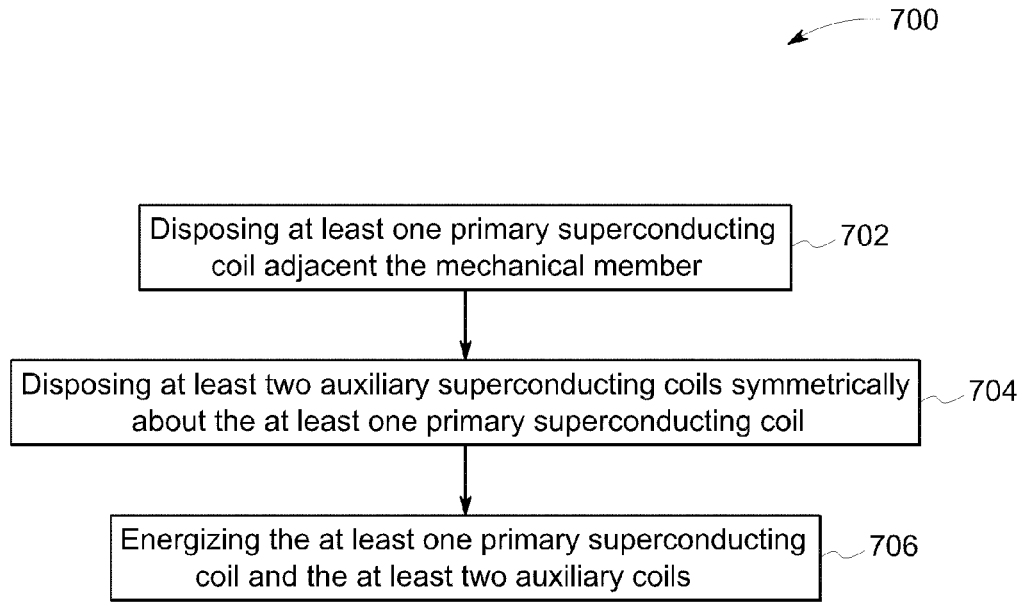
FIG. 7 is a flow chart depiction of a method of magnetizing a permanent magnet in-situ within a mechanical member, in accordance with one embodiment of the invention.

FIG. 7 is a flow chart depiction of a method 700 of magnetizing a permanent magnet in-situ within a mechanical member (for instance, a rotor of type 302) in accordance with one embodiment of the invention. The method 700 includes a step 702 of disposing at least one primary superconducting coil (for instance, of type 324) adjacent the mechanical member. The method 700 also includes a step 704 of disposing at least two auxiliary coils (for instance, of type 326, or 328) symmetrically about the at least one primary superconducting coil. In alternate embodiments of the method 700, the steps 702 and 704 are executed so that the at least one primary superconducting coil and the at least two auxiliary coils are disposed symmetrically with respect to each other. Quite generally, in alternate embodiments of the method 700, the steps 702 and 704 are executed so that the at least one primary superconducting coil and the at least two auxiliary coils are disposed symmetrically with respect to at least a portion of the mechanical member. The method 700 also includes a step 706 of energizing the at least one primary superconducting coil and the at least two auxiliary coils.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A magnetizer for magnetizing permanent magnets, comprising:
    at least one primary superconducting coil configured to project a magnetic field flux configuration of a first type to at least a portion of a distal volume of a first type; and
    at least two auxiliary coils symmetrically disposed about the at least one primary superconducting coil and configured to project magnetic field flux configurations of a second type to at least a portion of a distal volume of a second type;
    wherein said permanent magnets are positioned in-situ within a mechanical member; and
    wherein the at least one primary superconducting coil and the at least two auxiliary coils are configured to be energized independently of each other.

2. The magnetizer of claim 1, further comprising a structural member configured to support at least a portion of the magnetic field flux and simultaneously provide mechanical support for the magnetizer.

3. The magnetizer of claim 1, wherein the magnetizer is capable of magnetizing at least one of a plurality of permanent magnets independent of other magnets, wherein said plurality of permanent magnets are buried within the mechanical member.

4. The magnetizer of claim 3, wherein the mechanical member comprises a backiron of a rotor comprising a plurality of poles.

5. The magnetizer of claim 4, wherein the rotor is part of an interior permanent magnet electric machine.

6. The magnetizer of claim 4, wherein the rotor comprises a plurality of laminations stacked oriented along an axial direction of the rotor.

7. The magnetizer of claim 1, wherein the at least one primary superconducting coil comprises a material comprising β-tungsten type superconductors, high temperature superconductors, and combinations thereof.

8. The magnetizer of claim 7, wherein the β-tungsten type superconductor is selected from the group consisting of Nb3Al, Nb3Ga, Nb3Sn, V3Al, and V3Ga, and wherein the high temperature superconductor is selected from the group consisting of YBCO, and BSCCO.

9. The magnetizer of claim 7, wherein the β-tungsten type superconductor has a critical temperature between about 5 Kelvin to about 23 Kelvin.

10. The magnetizer of claim 1, wherein the at least two auxiliary coils are composed from a normal conductor material.

11. The magnetizer of claim 1, wherein the at least two auxiliary coils are composed from a material selected from the group consisting of low temperature superconductors, medium temperature superconductors, high temperature superconductors, and combinations thereof.

12. The magnetizer of claim 11, wherein the low temperature superconductor is niobium titanium.

13. The magnetizer of claim 11, wherein the high temperature superconductor is YBCO, and the medium temperature superconductor is MgB2.

14. The magnetizer of claim 11, further comprising a means to maintain the at least two auxiliary coils in a superconductive state in a manner independent of the at least one primary superconducting coil.

15. The magnetizer of claim 1, wherein the at least one primary superconducting coil is capable of supporting current densities of up to about 25 A/cm2.

16. The magnetizer of claim 1, further comprising a means to maintain the at least one primary superconducting coil in a superconductive state in a manner independent of either of the at least two auxiliary coils.

17. The magnetizer of claim 1, further comprising a means to drive electric current through the at least one primary superconducting coil when it is in a superconductive state in a manner independent of either of the at least two auxiliary coils, and through the at least two auxiliary coils in a manner independent of the at least one primary superconducting coil.

18. The magnetizer of claim 1, wherein the at least two auxiliary coils, when they are in an energized state, are configured to mitigate magnetic field flux configurations produced by the energized at least one primary superconducting coil within the second distal volume.

19. A method of magnetizing a permanent magnet, said method comprising the steps of:
(a) disposing at least one primary superconducting coil configured to project a magnetic field flux configuration of a first type, adjacent the mechanical member;
(b) disposing at least two auxiliary coils configured to project a magnetic field flux configuration of a second type, symmetrically about the at least one primary superconducting coil; and
(c) energizing the at least one primary superconducting coil and the at least two auxiliary coils independently of each other;
wherein said permanent magnet is positioned in-situ within a mechanical member.

20. The method of claim 19, wherein the mechanical member comprises a backiron of a rotor comprising a plurality of poles, each independently housing one or more of a plurality of permanent magnets.

21. The method of claim 20, wherein individual permanent magnets belonging to the plurality of permanent magnets are oriented along a substantially radial direction of the mechanical member.

22. The method of claim 19, wherein steps (a) and (b) are executed so that the at least one primary superconducting coil and the at least two auxiliary coils are disposed symmetrically with respect to each other.

23. The method of claim 19, wherein steps (a) and (b) are executed so that the at least one primary superconducting coil and the at least two auxiliary coils are disposed symmetrically with respect to at least a portion of the mechanical member.

24. A magnetizer, comprising:
at least one primary superconducting coil configured to project a magnetic field flux configuration of a first type to a distal volume;
at least two auxiliary superconducting coils symmetrically disposed about the at least one primary superconducting coil and configured to project magnetic field flux configurations of a second type to at least a portion of the distal volume;
wherein the at least one primary superconducting coil and the at least two auxiliary superconducting coils are configured to be energized independently of each other; and
a ferromagnetic member configured to support at least a portion of the magnetic field flux;
wherein the magnetizer is configured to magnetize at least one of a plurality of permanent magnets buried within a mechanical member, the mechanical member comprising a backiron of a rotor, wherein the rotor comprises a plurality of poles and is part of an interior permanent magnet electric machine.

25. The magnetizer of claim 24, wherein the ferromagnetic member further provides mechanical support for the magnetizer.

26. The magnetizer of claim 24, wherein the rotor comprises a plurality of laminations stacked oriented along an axial direction of the rotor.

27. The magnetizer of claim 24, wherein the at least one primary superconducting coil and the at least two auxiliary superconducting coils are composed of a material selected from the group consisting of β-tungsten type superconductors, low temperature superconductors, high temperature superconductors, and combinations thereof.

28. The magnetizer of claim 24, wherein the at least one primary superconducting coil and the at least two auxiliary superconducting coils are capable of supporting current densities of up to about 25 A/cm2.

29. The magnetizer of claim 24, further comprising a means to maintain the at least one primary superconducting coil and the at least two auxiliary superconducting coils in a superconductive state in a manner independent of each other.

30. The magnetizer of claim 24, further comprising a means to drive electric current through the at least one primary superconducting coil when it is in a superconductive state in a manner independent of either of the at least two auxiliary coils, and through the at least two auxiliary superconducting coils when they are in a superconductive state in a manner independent of the at least one primary superconducting coil.

* * * * *